Nov. 22, 1932.　　T. L. ROBINSON　　1,888,361

SELF ALIGNING BALL BEARING

Filed May 29, 1931

Inventor
THOMAS L. ROBINSON

Patented Nov. 22, 1932

1,888,361

UNITED STATES PATENT OFFICE

THOMAS L. ROBINSON, OF VALPARAISO, INDIANA

SELF-ALIGNING BALL BEARING

Application filed May 29, 1931. Serial No. 540,896.

This invention relates to ball bearings and relates particularly to self-aligning ball bearings.

The object of the invention is to provide an improved oil or grease seal for self-aligning ball bearings of the type comprising inner and outer bearing members, the inner bearing member being provided with an annular ball race or groove, the curvature of which is on a slightly longer radius than that of the anti-friction balls of the bearing and the outer bearing member being provided with a spherical ball race described from a center defined by the intersection of a plane passing through the center of the anti-friction balls with the axis of rotation of the bearing.

To effect the object thereof, an oil and grease seal embodying my invention and improvements comprises the various features, combinations of features and details of construction hereinafter described and claimed.

In the accompanying drawing in which the invention is fully illustrated,

Figure 1:
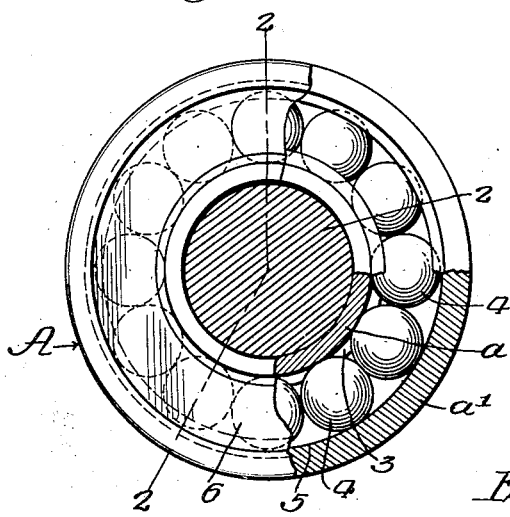
Fig. 1 is a side view of a bearing embodying my invention and improvements.
Figure 2:
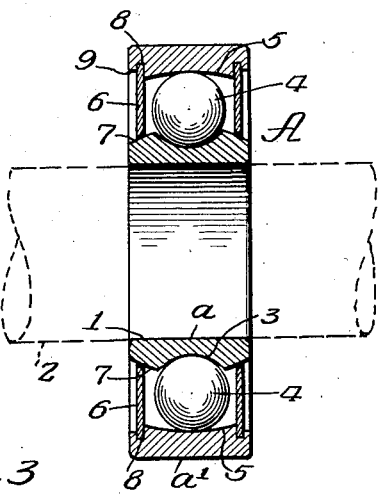
Fig. 2 is a sectional view thereof on the line 2—2 of Fig. 1, the bearing members being shown in alignment with each other in full lines, and at one limit of their misalignment in dotted lines.

Describing the invention with reference to the drawing, in which I have shown an oil or grease seal of my invention applied to a usual form of self-aligning ball bearing, designated as a whole A, $a$, $a'$ designate the inner and outer bearing members, respectively. The inner bearing member $a$ is provided with a central hole or opening 1 to receive a shaft or axle 2, to which the bearing is applied in use, said bearing member also being provided with a usual circumferential ball race 3 in which the anti-friction balls 4 are confined in operation, said ball race, in accordance with usual practice, preferably being struck on a slightly longer radius than the diameter of the anti-friction balls 4.

In accordance with usual practice, also, the outer bearing member $a'$ is provided with a ball race 5 described from a center located at the intersection of the axis of rotation of the bearing with a plane passing through the centers of the anti-friction balls 4.

In accordance with usual practice, also, the anti-friction balls 4 will be maintained in desired spaced relation by a suitable cage or ball retainer, not shown. All of the foregoing parts are old and well known in the art and will readily be understood by persons familiar with such devices from an examination of the drawing, without a further description thereof in detail.

To effect the object of the invention as it relates to providing an oil or grease seal for ball bearings of the type specified, I attain the object of the invention by the use of an oil seal comprising rings 6 of deformable sheet material, preferably non-resilient sheet metal, the outer edges of which are secured to the outer bearing member $a'$ at or adjacent to opposite sides thereof, respectively, and in symmetrical relation to the anti-friction balls 4, when the bearing members are in alignment, the inner ends of said rings extending into close proximity to spherically curved surfaces or lands 7 on the inner bearing member $a$ at opposite sides of the ball race 3, concentric with the ball race 5 in the outer bearing member, a usual clearance being .001 or .002 inches.

In accordance with what I now consider preferable practice, the sealing rings 6 are secured to the outer bearing member $a'$ by interlocking the outer edges of said rings with annular grooves 8 formed in said bearing member at opposite ends of the ball race 5.

Figure 3:
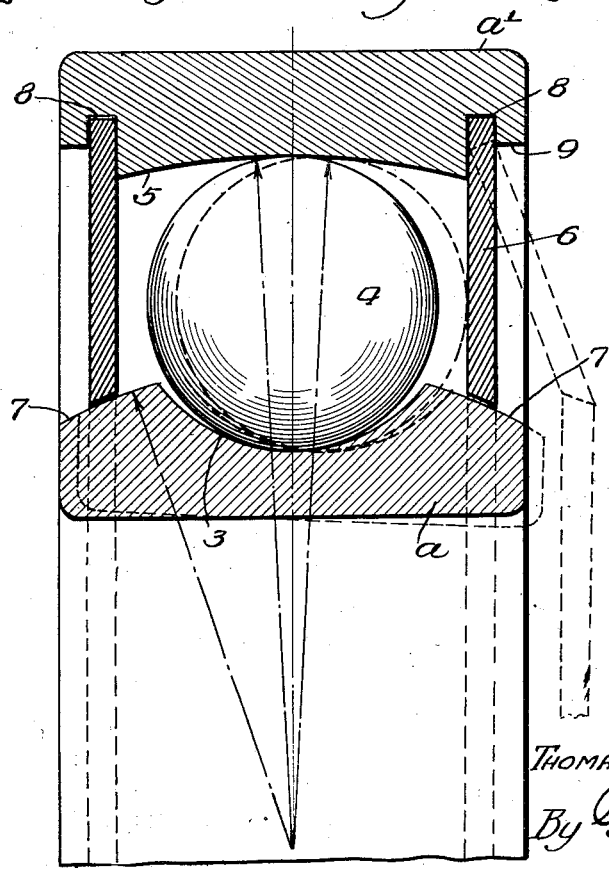
Fig. 3 is an enlarged, fragmentary diagrammatic view.

Interlocking of said sealing rings with the grooves 8 may be effected in a simple manner by making said rings initially dished, as shown in dotted lines in Fig. 3, the outside diameter of the dished rings being appreciably less than the diameters of the annular grooves 8, and the outer walls of said grooves being cut away, as shown at 9, so that the dished washers may be inserted through the openings thus formed into contact with the inner walls of said grooves, after which said dished rings will be subjected to endwise pressure, in situ, sufficient to flatten the same, which will operate in an obvious manner to expand said rings to effect interlocking of the outer edges thereof with the annular grooves 8, in the manner desired.

In accordance with the invention, misalignment of the bearing members $a, a'$, is limited by contact of the sealing plates 6 with the anti-friction balls 4.

I claim:

1. In combination, a self-aligning ball bearing, comprising outer and inner bearing members, the outer bearing member being provided with a spherical ball race described from a center positioned in the axis of rotation of the bearing, and the inner bearing member being provided with a usual ball race and with spherical surfaces at opposite sides of said ball race concentric with the spherical ball race in the outer bearing member when said bearing members are in alignment, and sealing means for said bearing, comprising rings of sheet material, the outer edges of which, respectively, are secured to the outer bearing member within the lateral faces of said bearing member, and the inner edges of which extend into close proximity to the spherical surfaces on the inner bearing member, misalignment of the bearing members being limited by contact of the sealing plates with the anti-friction balls confined in the ball race of the inner bearing member.

2. The combination specified in claim 1, in which the inner edges of said sealing plates will be opposed to the spherical surfaces on the inner bearing member in all operating positions.

In witness that I claim the foregoing as my invention, I affix my signature this 23 day of May, 1931.

THOMAS L. ROBINSON.